United States Patent
Gyori et al.

(10) Patent No.: US 10,614,552 B2
(45) Date of Patent: Apr. 7, 2020

(54) IMAGE SYNTHESIZER FOR A DRIVER ASSISTING SYSTEM

(71) Applicant: KNORR-BREMSE SYSTEME FUER NUTZFAHRZEUGE GMBH, Munich (DE)

(72) Inventors: Marton Gyori, Budapest (HU); Huba Nemeth, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 39 days.

(21) Appl. No.: 15/568,211

(22) PCT Filed: Apr. 22, 2016

(86) PCT No.: PCT/EP2016/059092
§ 371 (c)(1),
(2) Date: Oct. 20, 2017

(87) PCT Pub. No.: WO2016/170164
PCT Pub. Date: Oct. 27, 2016

(65) Prior Publication Data
US 2018/0144441 A1    May 24, 2018

(30) Foreign Application Priority Data
Apr. 24, 2015 (EP) .................................... 15164945

(51) Int. Cl.
*G06T 3/40* (2006.01)
*B60R 1/00* (2006.01)
*H04N 5/247* (2006.01)

(52) U.S. Cl.
CPC .............. *G06T 3/4038* (2013.01); *B60R 1/00* (2013.01); *B60R 2300/105* (2013.01);
(Continued)

(58) Field of Classification Search
CPC ..... G06T 3/4038; G06T 2200/32; G06T 5/50; B60R 1/00; B60R 2300/105;
(Continued)

(56) References Cited

U.S. PATENT DOCUMENTS

| 2006/0008171 A1* | 1/2006 | Petschnigg | ............... G06T 5/50 382/254 |
| 2012/0069153 A1* | 3/2012 | Mochizuki | ............... B60R 1/00 348/47 |
| 2012/0154592 A1 | 6/2012 | Muzuta | |

FOREIGN PATENT DOCUMENTS

| EP | 2739050 | 6/2014 |
| JP | 2002354468 | 12/2002 |

OTHER PUBLICATIONS

Image blending, Efros, 2010 http://graphics.cs.cm.edu/courses/15-463/2010 spring/Lectures/blending.pdf (Year: 2010).*
(Continued)

*Primary Examiner* — Jianxun Yang
(74) *Attorney, Agent, or Firm* — Norton Rose Fulbright US LLP; Gerard Messina (57) ABSTRACT

An image synthesizer for a vehicle driver assisting system, which includes a first camera to capture a first image from a first scene and a second camera to capture a second image from a second scene, the first and second scenes overlap in an overlapping region, which includes a blending region. The image synthesizer includes: a receiving module to receive the first and second images from the first and second cameras; and a combining module to combine the first and second images in the overlapping region by applying a blending mask. The blending mask is applied to the blending region and provides an interpolation along an interpolation direction between the first and second images depicted on opposite sides of the blending region, which includes a width greater than a minimal width along any path of light (Continued)

received by the first camera or of the second camera from the blending region.

13 Claims, 9 Drawing Sheets

(52) U.S. Cl.
CPC ... *B60R 2300/303* (2013.01); *B60R 2300/607* (2013.01); *G06T 2200/32* (2013.01); *H04N 5/247* (2013.01)

(58) Field of Classification Search
CPC ........ B60R 2300/303; B60R 2300/607; H04N 5/247; H04N 7/181; G08G 1/168
See application file for complete search history.

(56) References Cited

OTHER PUBLICATIONS

International Search Report dated Jul. 22, 2016, of the corresponding International Application PCT/EP2016/059092 filed Apr. 22, 2016.

\* cited by examiner

IMAGE SYNTHESIZER FOR A DRIVER ASSISTING SYSTEM

FIELD OF THE INVENTION

The present invention relates to image synthesizer and a method for synthesizing an image and, in particular, to an image synthesizing for a surround view system in a vehicle based on a wide blending close to the vehicle.

BACKGROUND INFORMATION

Surround view systems for passenger cars showing the vehicle from a bird's eye view are available from several manufacturers. A few solutions are also available for commercial vehicles, wherein multiple cameras are employed to cover various sides of the vehicle. These multiple cameras may produce partially overlapping views that should be combined (synthesized) in the overlap areas to obtain a combined image. Otherwise, the two separate views of the same object may confuse the driver.

Although the creation of the bird's eye view of a vehicle is a common driver assistance application, in the area where the views of two cameras are to be combined together, the visibility of the objects is still not yet optimal. Due to the projection of the camera images to the ground, vertical objects are projected in the bird's eye view image in a way that they appear along a line extending away from the camera (i.e. radially from the camera ground point). Hence, at the location where the views of two cameras meet, the objects are projected into the areas, which are visible from the other camera, but the other camera does not show the object at this position. This may lead to a disappearance of the object in the bird's eye view.

Different methods for synthesizing the images into a single bird's eye view are used by available systems. For example, a simple way is to separate the overlapping portions of the images with a straight line, and so to sidestep the problem, though at the cost of an abrupt change in the view as an object crosses the line. Another way is to allow an overlapping of the images, but to apply around the stitching line different kinds of blending procedures to obtain a transition from one camera view to the other.

Conventional blending procedures combine the images with a gradient transition from one image to the other by adding smoothly varying percentages of the different views in the overlapping area. This gradient blending area can be narrow (resulting in sharp transitions) or wide (resulting in slow transitions).

Figure 8A:
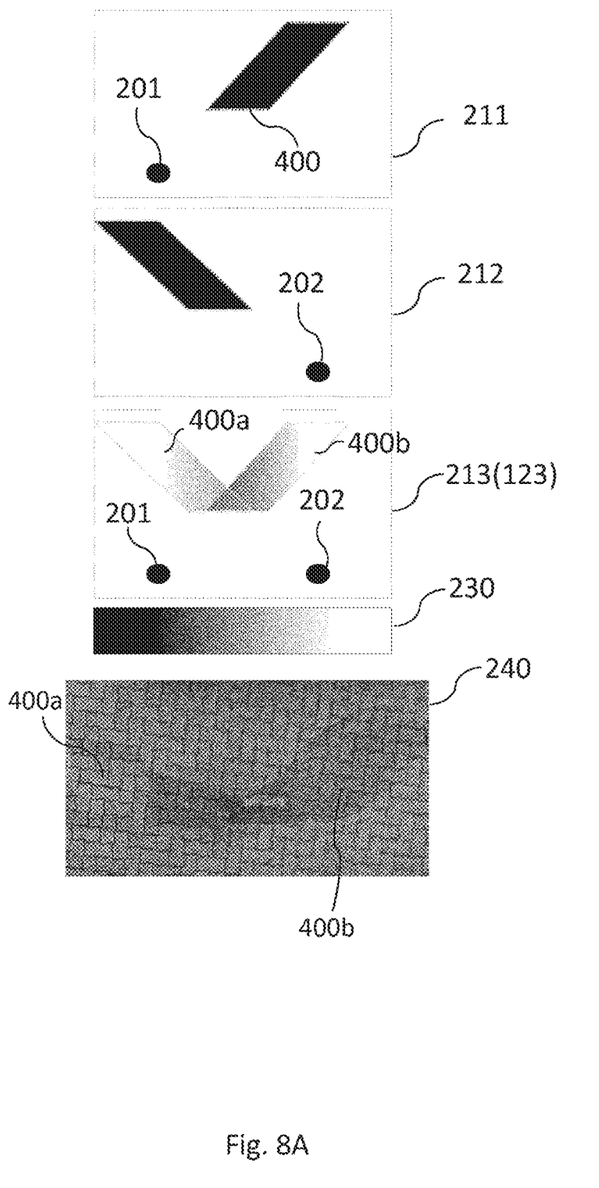
FIGS. 8A and 8B illustrate conventional wide and narrow blending procedures.
Figure 8B:
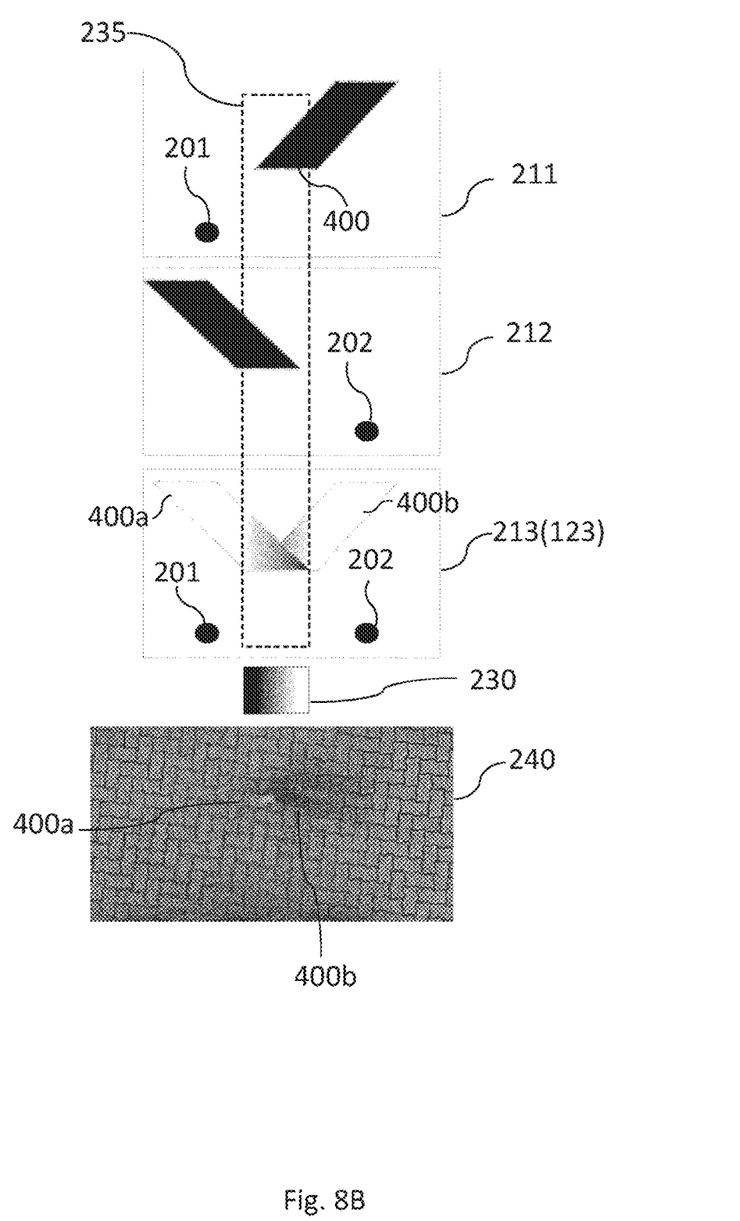

FIGS. 8A and 8B illustrate an example for a wide blending (in FIG. 8A) and an example for a narrow blending (in FIG. 8B).

In these examples a first camera 201 captures a first image 211 from an object 400 and a second camera 202 captures a second image 212 from the same object 400, but from a different perspective. Although the object 400 might be an upright standing person, in the first and second images 211, 212 the object 400 appears to extend away from the position of the first and second cameras 201, 202. Hence, the object 400 seems to extend in different directions. The length of the depicted object 400 depends on various quantities as e.g. the position of the first camera 201 (or the height differences between the camera position and person's height) and the distance of the object 400 from the first and second camera 201, 202.

In order to obtain a bird's eye view, the first image 211 and the second image 212 should be combined in a combined image 123. In this example the first image 211 and the second image 212 completely overlap so that the blending procedure should be applied for the whole area 213 covered by the first image 211 and the second image 212. A blending mask 230 is employed for the blending procedure, which interpolates smoothly from a white color (on the right hand side) to a black color (on the left hand side). The colors of the mask are associated with the two images or their respective image data. Therefore, the smooth transition from white to black corresponds to a smooth transition from one image to the other image.

In the blending mask 230, the second image 212 is assigned to the white color and the first image 211 is assigned to black color. When applying the blending (e.g. pixel by pixel), the combined image 123 depicts on the right-hand side only the second image 212. Therefore, on the right-hand side no object appears, because in the second image 212 the object is tilted toward the left. When continuing the blending toward the left-hand side, more and more contributions from the first image 211 are added (i.e. more pixel data from the first image 211 are added to pixel data of the second image 212). At the end, on the left-hand side of the combined image 123, only the first image 211 is depicted. Also at this position no object is visible, because it is tilted to the right in the first image 211. As a result, only in the intermediate region between the first and second camera 201, 202 a combination of the object 400 shown in the first image 211 and shown in the second image 212 is visible. Therefore, the combined image 123 seems to show two objects 400a, 400b, one object 400a from the contribution added from the second image 212 and another object 400b resulting from the object as depicted in the first image 211. It should be understood, however, these objects 400a, 400b are only copies of single object.

At the bottom of FIG. 8A an exemplary picture 240 is shown, wherein the two copies 400a and 400b of the object are visible. As described before, this doubling or ghost-like appearance of two copies (which actually relate only to one object) is a consequence of the different perspectives (angle of view) of the first and second cameras 201, 202 capturing images from different angles.

FIG. 8B depicts a combination of the same first and second images 211, 212, but now using a narrow blending instead of a wide blending employed in FIG. 8A. In the narrow blending the first image 211 and the second image 212 are interpolated in a more narrow blending region 235 and not over the whole width of the first and second image 211, 212 as done in FIG. 8A. Outside this blending region 235, either the first image 211 (on the left-hand side) or the second image 212 (on the right-hand side) are shown. As it is apparent from the positioning of the blending region 235, at least half of the object 400 is cut away so that only the leg-region of the exemplary person might be visible in the combined image 123. The head and body part will not be visible. Therefore, in the exemplary picture 240, depicted at the bottom of FIG. 8B, the body and head of the person are cut off so that the person is barely visible.

This is the aforementioned disappearance of parts of the object as consequence of a narrow blending. This, of course, causes confusion to the driver who does not know whether there is an obstacle or not.

Therefore, there is a demand for an image synthesizer, which overcomes the aforementioned problems and, in particular, generates a combined image that clearly depicts obstacles even close to the vehicle.

SUMMARY OF THE INVENTION

The present invention solves the afore-mentioned problems by providing an image synthesizer according to claim 1, a driver assisting system according to claim 9 and a method of synthesizing an image according to claim 12. The dependent claims refer to specifically advantageous realizations of the subject matters of the independent claims.

The present invention relates to an image synthesizer for a driver assisting system. The driver assisting system includes a first camera configured to capture a first image from a first scene and a second camera configured to capture a second image from a second scene, the first scene and the second scene overlap in an overlapping region. The image synthesizer comprises a receiving module and a combining module. The receiving module is configured to receive the first image from the first camera and the second image from the second camera. The combining module is configured to combine the first image and the second image in the overlapping region by applying a blending mask. The overlapping region comprises a blending region and the blending mask is applied to the blending region and provides an interpolation along an interpolation direction between the first image and the second image depicted on opposite sides of the blending region. The blending region comprises a width measured in the first image as captured by the first cameras and/or the second image as captured by the second cameras, wherein the width has a non-zero minimal value. The width is measured in any possible object plane or image plane of the captured images.

The receiving module and combining module should be understood broadly to relate to any entity able to provide the respective functions. In particular, the modules may be implemented in a control unit (e.g. of the driving assisting system), e.g. as software modules to enable the control unit to provide the defined functions.

The term "masking" should be understood broadly and should relate to any procedure within which at least a part of image data of one image is removed or is replaced by other image data of another image. Therefore, the masking may not only be related to the blending procedure which defines an interpolation between one image and another image, but also to those portions of the overlapping region, wherein the first image or the second image is merely depicted.

For example, in an embodiment, the blending mask is formed as a masking strip extending away from a corner of the vehicle or from a side of the vehicle. On each side of the masking strip either the first image or the second image may be shown, but not a combination of both. This masking strip may comprise a selectable constant width or the width of the masking strip has a maximum value that is less than a predetermined value (=n*Dmin, wherein Dmin is the minimum value and n=1.5, 2, 2.5, 3 or any other value). Again, the width is measured in any possible object plane and, thus, the width is in general a function comprising a maximum and a minimum.

In yet another embodiment the first scene may be adjacent to a first side of a vehicle and the second scene may be adjacent to the second side of the vehicle, the second side being perpendicular to the first side of the vehicle (or at any other angle). The combining module may be configured to combine the first image and the second image to a bird's eye view of the first scene and the second scene. Both cameras may also be arranged along one side of the vehicle (e.g. for a long vehicle). In this case the overlapping region may be the region that is equally spaced away from both cameras (i.e. around the middle line).

In yet another embodiment the minimal width of the blending region may be selectable in a range to make traffic objects (e.g. obstacles) of different sizes visible without cutting off parts of the traffic objects. For example, the minimum width is selected such that a traffic object of less than a predetermined height (e.g. 3 m, 2.5 m or 2 m) is depicted completely in the first and/or second image. Thus, the objects are visible without that parts of the objects are cut-off due to the projection of the objects in regions, which would otherwise be outside the masking region.

In yet another embodiment the blending region comprises a plurality of pixels and the blending mask defines for each pixel of the plurality of pixels in the blending region a pixel value P which is defined by: $P=\alpha*I_1+(1-\alpha)*I_2$ wherein P denotes the pixel value calculated as the weighted sum of the respective pixel value $I_1$ of the first image and the respective pixel value $I_2$ of the second image, wherein the weight function $\alpha$ depends on the position in the blending region such that the pixel values P interpolate between the pixel values $I_1$, $I_2$ of the first image and the second image along the interpolation direction W of the blending region (on which the function $\alpha$ depends). A function should be understood broadly as referring to any relation assigning input values to output values. The function may be smooth or non-smooth and should include in particular continuous and binary functions.

Therefore, in yet another embodiment the weight function $\alpha$ is for at least some of the plurality of pixels a binary function taking only a first value being zero and a second value being one in the blending region. The interpolation between the first image and the second image is achieved by varying a relative distribution of the first and second values inside the blending region. For example, the mask may comprise a pattern with first portions and second portions, wherein the combining module is configured to depict in the first portions respective portions of the first image and in the second portions respective portions of the second image. The resulting combined image represents an alternating view of the first image and the second image in the overlapping region along at least one direction. Each portion may comprise one or more pixels and portions of the images may be understood as the respective pixel values.

If the masking region is a masking strip, this masking strip may comprise a width that, according to yet another embodiment, is at least piece-wise constant and the weight function $\alpha$ varies only along the interpolation direction and is constant along the direction along the masking strip (perpendicular to the interpolation direction).

In yet another embodiment, the interpolation along the interpolation direction is defined by an at least piecewise linear function and/or an at least piecewise non-linear function and/or an at least piecewise constant function or any combination thereof.

The present invention relates also to a driver assisting system. The driver assisting system comprises an image synthesizer as described previously, a first camera configured to capture a first image from a first scene and a second camera configured to capture a second image from a second scene, wherein the first scene and the second scene partly overlap over in an overlapping region.

In another embodiment the driver assisting system comprises a display and a control unit configured to receive the combined image from the combining module and to create a bird's eyes view from the first image, the second image and the combined image and to display the bird's eye view on the display.

The present invention relates also a vehicle with a driver assisting system as described before, wherein the first camera and the second camera are arranged along one side of the vehicle or on two adjacent sides of the vehicle.

The present invention relates also a method for synthesizing an image using a driver assisting system. The driver assisting system comprises a first camera configured to capture a first image from a first scene and a second camera configured to capture a second image from a second scene. The first scene and the second scene (partly) overlap over an overlapping region, wherein the overlapping region comprises a blending region. The method comprises: receiving the first image from the first camera and the second image from the second camera; and combining the first image and the second image in the overlapping region by applying a blending mask to the blending region. The blending mask provides an interpolation along an interpolation direction between the first image and the second image depicted on opposite sides of the blending region, and wherein the blending region comprises a width greater than a minimal width along any path of light received by the first camera or of the second camera from the blending region.

This method may also be implemented in software or a computer program product. Thus, the present invention relates also to a computer program product having a program code stored thereon for performing the above-mentioned method, when the computer program is executed on a computer or a processor. In addition, all functions described previously in conjunction with the image synthesizer or the driver assisting system can be realized as further method steps and be implemented in software or software modules. For example, the minimal width depends on the particular positions of the first and second cameras and the size of the vehicle and may be implemented in the software as a parameter dependent on these quantities, which will be added in concrete realizations of the present invention.

Various embodiments of the present invention will be described in the following by way of examples only, and with respect to the accompanying drawings.

DETAILED DESCRIPTION

Figure 1:
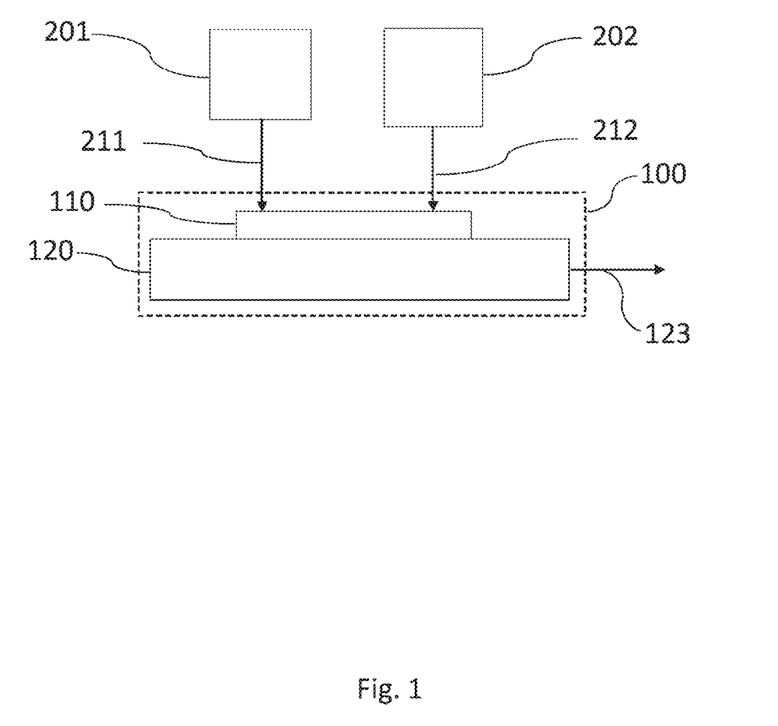
FIG. 1 depicts an image synthesizer according to an embodiment of the present invention.

FIG. 1 depicts an image synthesizer 100 for a driver assisting system of a vehicle. The driver assisting system includes a first camera 201 configured to capture a first image 211 from a first scene, and a second camera 202 configured to capture a second image 212 from a second scene. The first scene and the second scene overlap in an overlapping region 213 (see FIG. 2). The overlap may be partly or completely. The complete overlap may occur if the first and second cameras 201, 202 take pictures from one side of a vehicle, but from different perspectives so that objects on the images are seen from different sides. The partly overlap may occur, for example, at a corner region of a vehicle, wherein part of the each image is visible only for one camera, but not for the other camera.

The image synthesizer 100 comprises a receiving module 110 and a combining module 120. The receiving module 110 is configured to receive the first image 211 from the first camera 201 and the second image 212 from the second camera 202. The combining module 120 is configured to combine the first image 211 and the second image 212 in the overlapping region 213 using a blending mask 130. The combining module 120 may further be adapted to output the combined (synthesized) image 123 to a display unit (not shown). Both the receiving module 110 and the combining module 120 may be implemented in a control unit of the driver assisting system. For example, the receiving module 110 may be an input interface and the combining unit 120 may be implemented as a software module.

An equivalent realization would be that the receiving module 110 is configured to carry out the described masking.

FIGS. 2A-C show further details of the blending procedure according to embodiments of the present invention. In the depicted exemplary situation, the first image 211 and the second image 212 depict different sides of a vehicle 500. For example, the first image can depict the right-hand side of the vehicle 500 (in regular driving direction) and the second image 212 may depict the rear side of the vehicle. As a consequence, the first image 211 and the second image 212 overlap in an overlapping region 213 around a corner 505 of the vehicle 500. The overlapping region 213 includes a blending region 235 wherein the blending procedure is applied by using a blending mask 130 (see FIG. 4 below) such that the first image 211 is depicted at a first side 235a of the blending region 235 and the second image 212 is depicted at a second side 235e (opposite to the first side 235a) of the blending region 235. The blending mask 130 provides an interpolation along an interpolation direction W between the first image 211 and the second image 212, i.e. between the first side 235a and the second side 235e of the blending region 235.

There are different possibilities to place the blending region 235 within the overlapping region 213, which are shown in FIGS. 2A, 2B and 2C.

In FIG. 2A the blending region 235 is placed diagonal in the overlapping region 213, whereas FIG. 2B and FIG. 2C show non-diagonal placements for the blending region 235 according to the present invention. In particular, in FIG. 2B the blending region 235 does not extend along the middle direction of the overlapping region 213 as in FIG. 2A, but is adjacent to the non-overlapping part 211a of the first image 211. Similarly, FIG. 2C depicts the embodiment, wherein the blending region 235 is arranged adjacent to the non-overlapping part 211b of the second image 212. Therefore, the position of the blending region 235 is not limited within the present invention. All possibilities have in common that a wide blending is used even close to the vehicle 500, as it will be described in the following.

According to the present invention, the first side 235a and the second side 235e of the blending region 235 are spaced apart along the interpolation direction W so that the blending mask 130 comprises a width greater than a minimal blending width Dmin of any path of light received by the first camera 201 and/or of the second camera 202 from the blending region 235 (i.e. any light passing the blending region 235). Thus, the minimal value Dmin as measured along light paths of light received by the cameras at the rear side and the right-hand side of the vehicle 500 may be indicated by the double arrow (or parallel thereto). However, the minimal value Dmin may also be measured in any object plane of the first image 211 and/or the second image 212 (i.e. any plane parallel to the respective side of the vehicle).

It is to be understood that the object in the images will always extend away from the position of the cameras and are always projected inside the overlapping region 213, but not in non-overlapping portions 211*a*, 212*a* of the first and second images 211, 212. Therefore, an object at the corner region 505 will appear in the first/second image 211/212 extending in the overlapping region 213, i.e. parallel to the double arrow Dmin (either toward the top or toward the left). Furthermore, because the minimum width Dmin is non-zero, even at the corner region 505 a non-zero blending width is provided and since Dmin can be selected freely, it is always possible to make visible any objects—even the object is directly at the corner 505.

Hence, by selecting Dmin appropriately, the disadvantages of the conventional driver assisting applications (i.e. cut-off of portions of the objects) are overcome.

Figure 2:
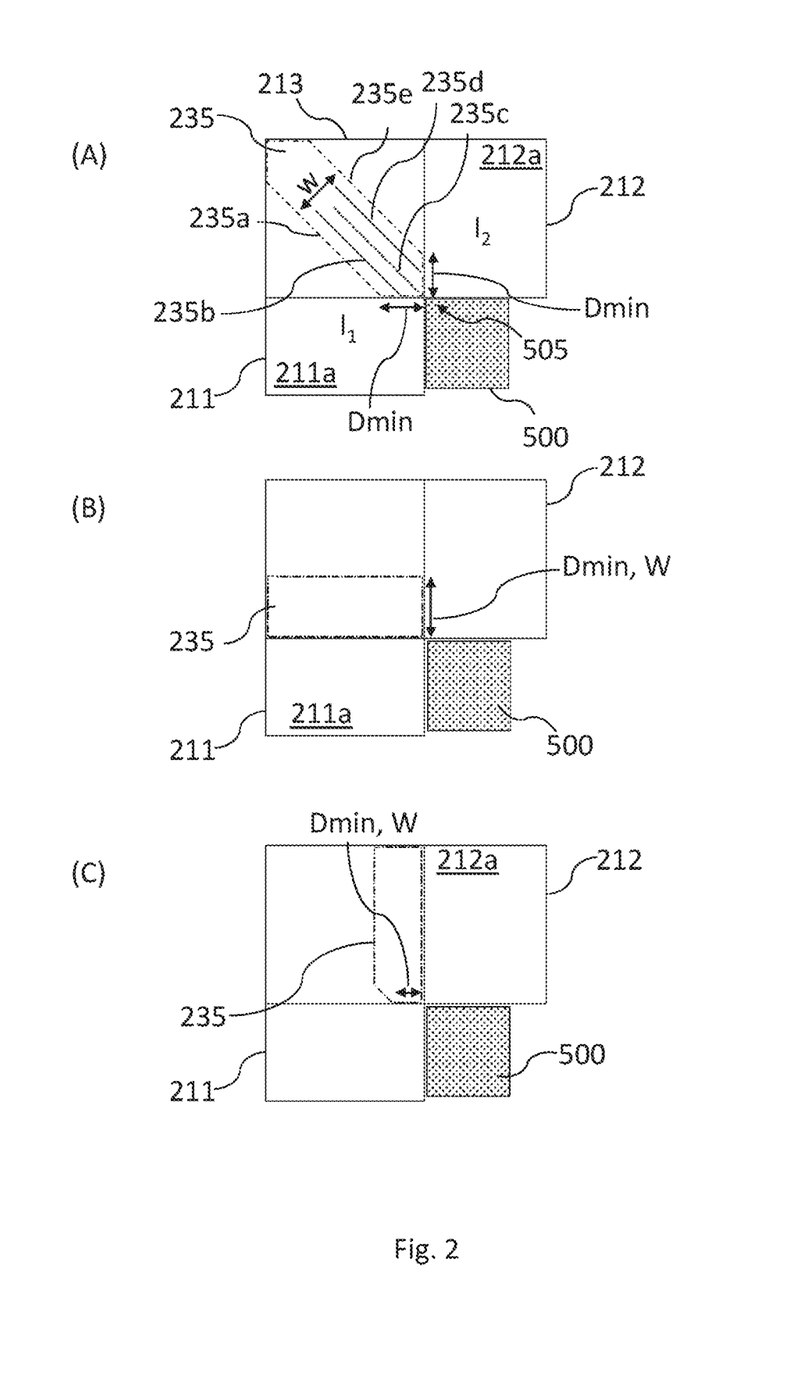
FIGS. 2A, 2B and 2C depict an embodiment for combining two images into a synthesized image around a corner of a vehicle.

In the embodiment depicted in FIG. 2 the blending region 235 is a strip (masking strip). This form of the blending region 235 is optional, but not essential for the present invention. FIGS. 2A-2C depict three different forms of the blending regions 235, which have all in common that the minimum value Dmin is non-zero. A person skilled in the art will readily consider other forms for the blending region 235 as appropriate for other situations.

The blending of the two images performed in the blending region 235 (or blending area) can be carried out pixel-wise for each pixel of the blending area 235. For example, when the blending area 235 defines a strip with a width w (as shown in FIG. 2), each pixel value P along the width direction W can be represented by the following equation:

$$P = \alpha * I_1 + (1-\alpha) * I_2 = I_2 + \alpha * (I_1 - I_2), \quad (1)$$

wherein for a given pixel $I_1$ represents the image data of a respected pixel of an image 1 and $I_2$ corresponds to the image data of an image 2 (e.g. the first and the second image 211, 212) so that P is the resulting pixel value of the combined image 123 (depicting the overlapping region 213). In addition, the parameter $\alpha$ is the interpolation parameter, which interpolates the image data by running from 0 (image 2) to 1 (image 1).

Therefore, when applying the blending procedure to the overlapping area 213 or the blending area 235, the parameter $\alpha$ is a function dependent, for example, on a coordinate of the width direction W such that the function $\alpha$ becomes 0 (or close to 0) on one side of the blending area 235 and becomes 1 (or close to 1) on the other side of the blending area 235. Therefore, the parameter $\alpha$ parameterizes the percentage or proportion of the first and second images 211, 212 for a given pixel in the blending area 235.

The gradient blending refers to the case, where the parameter $\alpha$ is a smooth function such that the pixel values of the first image 211 and the second image 212 are added up with a weight defined by $\alpha$ (parameterizes the contribution proportional to the difference $I_1 - I_2$). This defines, however, only one possible blending. According to further embodiments, the parameter $\alpha$ may also parameterize a binary blending, in which case the parameter $\alpha$ is binary function and can only take two values: 0 and 1 (or close to these values). For this blending, within the blending area 235, each pixel depicts either image 1 or image 2 (i.e. the respective image data). In this case, the interpolation from one image to the other image is achieved by varying the density of pixels showing image 1 within a plurality of pixels showing image 2 (see also FIG. 4).

The interpolation as described in conjunction with Equation (1) may be performed, for example, along the width direction W. The interpolation parameter $\alpha$ may be the distance measured in the width direction W, but may not be an angle. The width direction W extends from the first side 235*a* to the second side 235*e* (see FIG. 2A) and can be defined as the direction perpendicular to the distance extending away from the vehicle 500. The parameter $\alpha$ may, for example, take on the second side 235*e* the value 0 and on the opposite first side 235*a* the value 1. FIG. 2A shows three additional exemplary lines 235*b*, 235*c* and 235*d*, which are parallel to the first and second side 235*a* and 235*e* and define lines along which the parameter $\alpha$ may remain constant. These lines define an increased percentage of the first image 211 as compared to the second image 212. For example, along the first additional line 235*b* the parameter $\alpha$ may take the value of 0.75, along the second additional line 235*c* the parameter $\alpha$ may take the value of 0.5 and along the third additional line 235*d* the parameter $\alpha$ takes the value of 0.25. Of course, these values are only examples and the lines do not need to be parallel to each other.

As a result, along the width direction W the parameter $\alpha$ continuously varies from 0 on second side 235*e* of the masking strip 235 to the value 1 on the opposite first side 235*a* of the masking strip 235. Outside the masking strip 235 the image data in the overlapping region 213 are either taken from the second image 212 (on the side toward the non-overlapping part 212*a* of the second image 212) or from the first image 211 (on the side of the blending mask 235 facing the non-overlapping part 211*a* of the first image 211).

Of course, the described interpolation represents only one example. A person skilled in the art can readily set up further interpolations.

Figure 3:
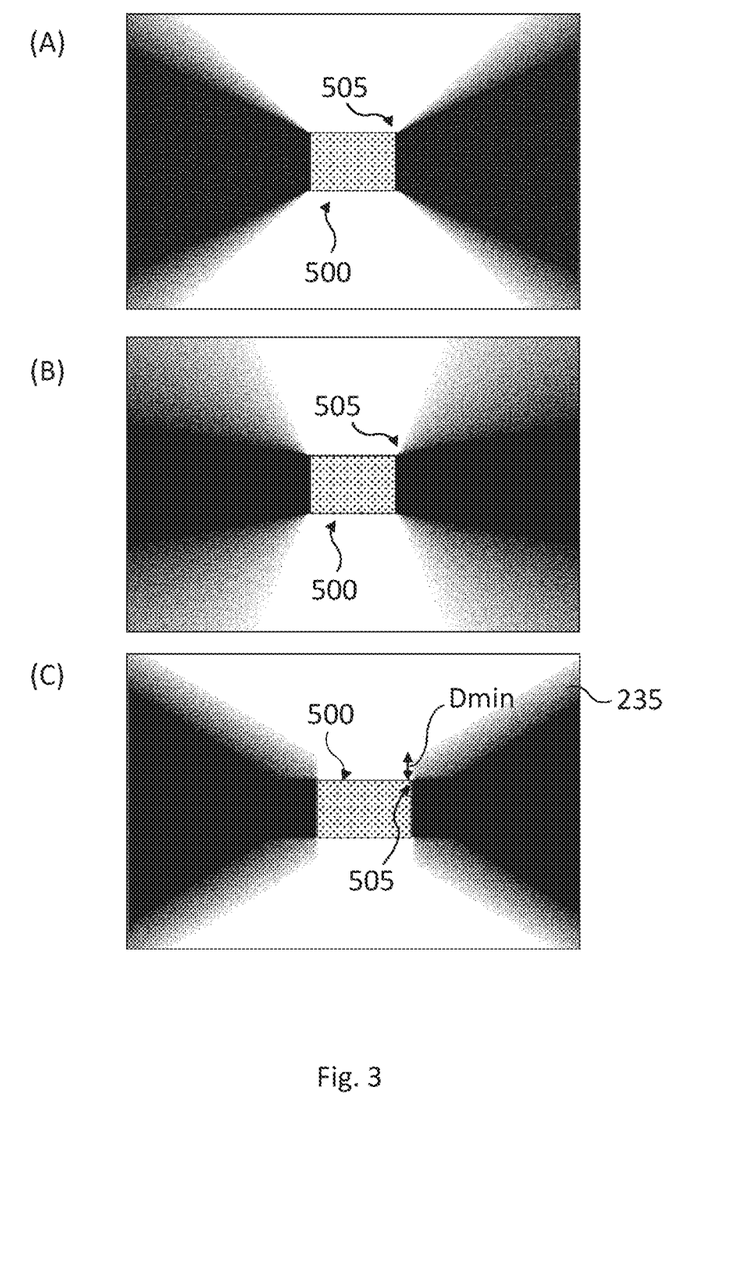
FIG. 3 compares a conventional gradient blending with an image synthesizing according to the present invention.

To make advantages of the present invention more apparent in FIG. 3 examples for conventional blending procedures (in FIG. 3A and FIG. 3B) are compared with the blending according to the present invention (see FIG. 3C). In these figures the vehicle 500 is depicted at a center, wherein four cameras are provided to capture images for four sides of the vehicle 500. The four sides are perpendicular to each other so that at the corner regions 505 a blending is applied to interpolate between the different images taken by cameras.

FIG. 3A shows an example for a narrow blending, wherein the blending procedure is applied within a limited angular region extending, for example, from 40° to 50° around the corner 505 of the vehicle 500. On the other hand, FIG. 3B shows a wide blending, wherein the blending is applied over a wide angular region, for example, extending over the whole corner region 505 from 0° to 90°.

Therefore, this wide and narrow blending can be implemented by associating an angle (e.g. around the corner region 505) with the parameter $\alpha$ such that the angle varies from 0° to 90° (defining e.g. a wide blending) or from 40° and 50° (defining e.g. a narrow blending). Depending on the blending width (angular region) an object at the corner region 505 will be projected in the region, which is masked. For example, in the FIG. 3A part of an object at the corner region 505 will either be projected into the wide region (for the black image taken on the right-hand-side in FIG. 3A) or into the black region (for the black image taken on the topside in FIG. 3A). As described with FIG. 7B, for such blending procedures substantial parts of the object may be cut-off and may not be visible.

The blending according to the present invention is shown in FIG. 3C. In contrast to the conventional blending procedures of FIGS. 3A, 3B, the blending according to the present invention defines a wide interpolation region even close to the corner region 505 of the vehicle 500. The wide blending close to the vehicle 500 ensures that objects close to the vehicle 500 remain visible and are not cut-off, because the present invention defines a minimal (nonzero) width Dmin for the blending region 235, which ensures that the objects are always projected into a blending region but not outside (e.g. by adjusting Dmin accordingly). The minimum value for the width is zero in the conventional blending procedures, because the interpolation parameter is an angle in these cases so that close to the vehicle 500 the width of the blending region becomes arbitrary small.

By comparing FIGS. 3A and 3C, it is apparent that in the conventional blending it is not possible to avoid any cut-off of the objects close to the vehicle 500. Even though the conventional blending procedures could also implement a wider blending, this wide blending amplifies the ghosting of objects further away from the vehicle, because the wide blending region increases with the distance from the vehicle (see FIG. 3B). It is further noted, according to the present invention the blending width can remain constant with the distance from the vehicle and thus the ghosting can be controlled.

Therefore, when using the blending masks according to the present invention for creating the bird's eye view, the wide blending already in the area close to the vehicle avoids the drawbacks of the conventional masks where objects fades out at the sides due to the narrow blending area. The wider blending allows a better visibility of objects in this area close to the vehicle and eliminates the possibility of disappearance of an obstacle.

Figure 4:
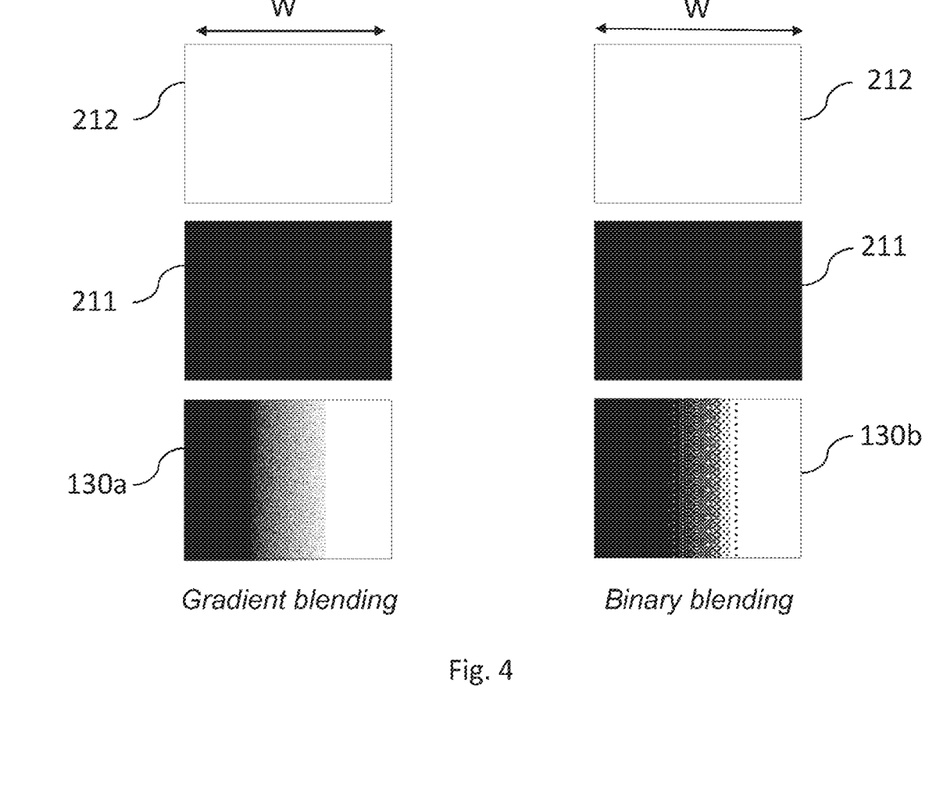
FIG. 4 depicts two types of blending masks for image synthesizing.

FIG. 4 depicts two examples for the blending mask 130 that implements the interpolations along the interpolation direction W as shown in FIG. 2.

The left-hand side of FIG. 4 shows a gradient blending mask 130a, wherein the parameter α of eq. (1) is a smoothly varying function interpolating between the second image 212 on the right-hand side (e.g. α=0) to the first image 211 on the left-hand side (where α=1).

The right-hand side of FIG. 4 shows a binary blending mask 130b, wherein the parameter α is not a smooth function on the position within the blending region 235, but the parameter α can only take values 0 and 1 (i.e. it is a binary function). Also this binary mask 130b defines an interpolation from the second image 212 on the right-hand side to the first image 211 on the left-hand side. However, in this case, the interpolation between both images is achieved by a varying density of pixels belonging to the first image 211 within pixels belonging to the second image 212 or vice-versa.

Figure 5:
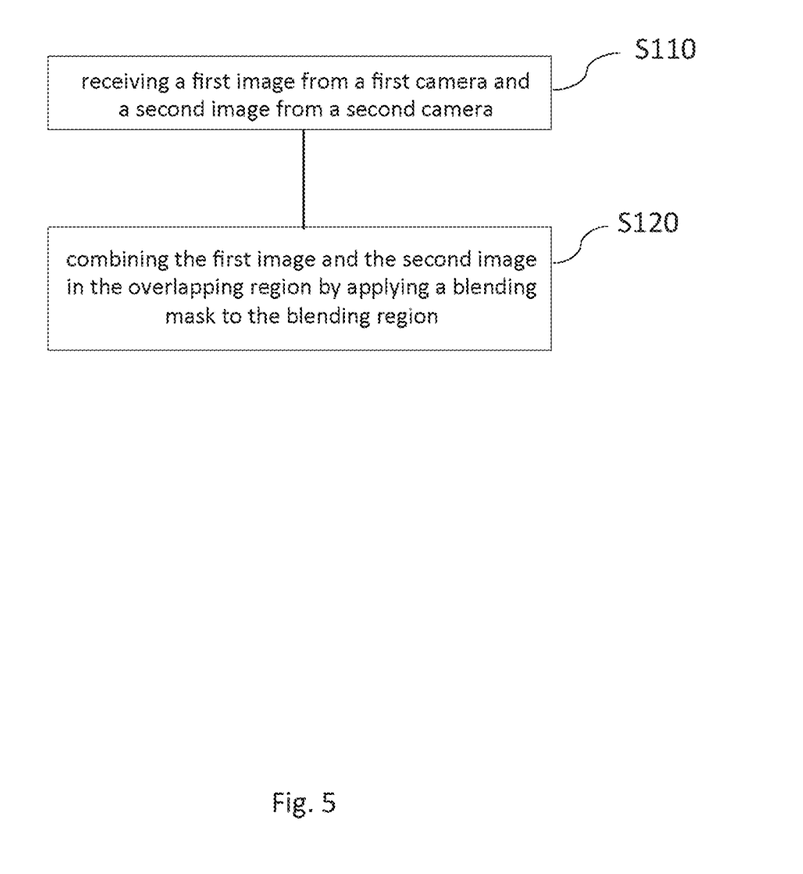
FIG. 5 illustrates a method according to an embodiment of the present invention.

FIG. 5 illustrates an embodiment for a method for synthesizing an image and may carried out by the image synthesizer as shown in FIG. 1. Therefore, the method comprises the steps of receiving S110 the first image 211 from the first camera 201 and the second image 212 from the second camera 202, and combining S120 the first image and the second image 211, 212 in the overlapping region 213 by applying the blending mask 130 to the blending region 235.

The blending mask 130 provides an interpolation along an interpolation direction W between the first image 211 and the second image 212 depicted on opposite sides of the blending region 235, and wherein the blending region 235 comprises a width greater than a minimal width Dmin along any path of light received by the first camera 201 or of the second camera 202 from the blending region 235 region using the binary mask 130.

Figure 6:
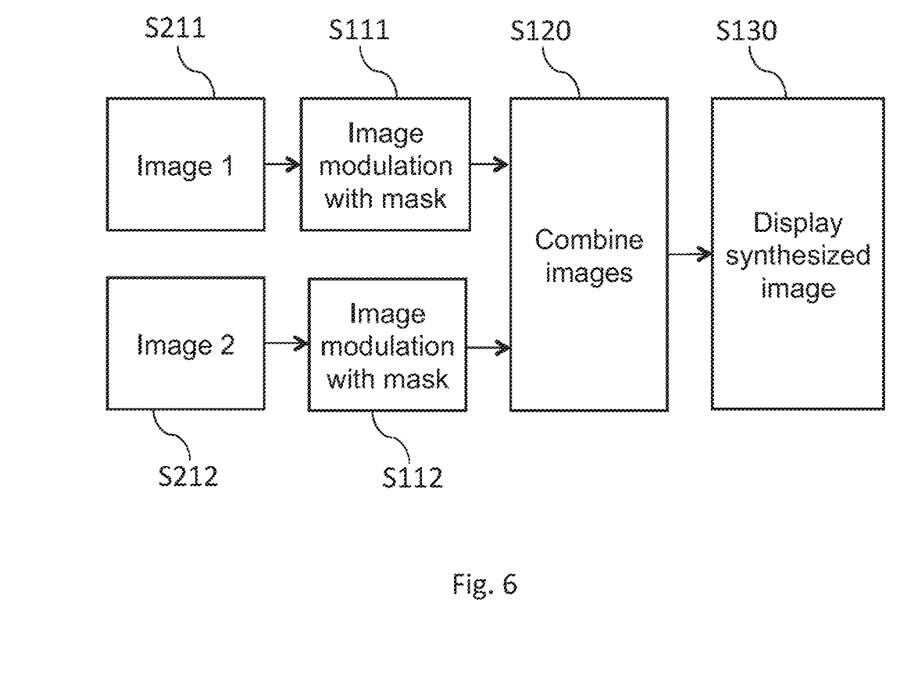
FIG. 6 depicts another embodiment implementing the procedure to combine two input images into a synthesized image.

FIG. 6 illustrates another embodiment of the inventive method with further optional steps. In a first step S211 the first image 211 (image 1) is captured by a first camera 201 and is received by the receiving module 110. In step S212 the second image 212 (image 2) is captured by a second camera 202 and is received by the receiving module 110.

The first image 211 is modulated with a first mask in step S111 and the second image 212 is modulated with a second mask in step S112. Both images may comprise a plurality of pixels and the image data are the pixel values (e.g. the brightness and/or color). The overlapping region depicts the same scene, although both cameras show possibly different perspectives. Also the overlapping region can be characterized by a plurality of pixels. When applying a mask to this overlapping region, the pixels of the overlapping region are selected to depict parts of the first image 211 or parts of the second image 212 as parameterized by the exemplary parameter α, or depict either the first image 211 or the second image 212. Therefore, the first and second mask may be complementary to each other, i.e. the masking (or modulating) of the first image 211 selects a first part from the first image 211 and the masking of the second image 212 selects a second part from the second image 212.

Subsequently, in step S120, the modulated first image and the modulated second image are combined using the blending mask and finally, in step S130, the synthesized image 123 is displayed on a display, e.g., of a driver assisting system.

FIGS. 7A-D depict various possibilities for the blending masks as they are defined by equation 1, wherein the blending masks define exemplary interpolations between a pixel value 0 to a pixel value 1 along the interpolation parameterized by an interpolation parameter starting at an exemplary value 0 (or 50) to 300 (or 250).

Figure 7A:
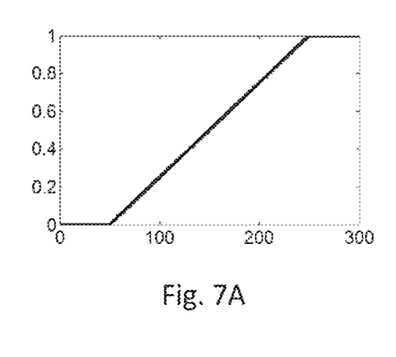
FIGS. 7A, 7B, 7C and 7D depict various possibilities for interpolations implemented by various blending masks.
Figure 7B:
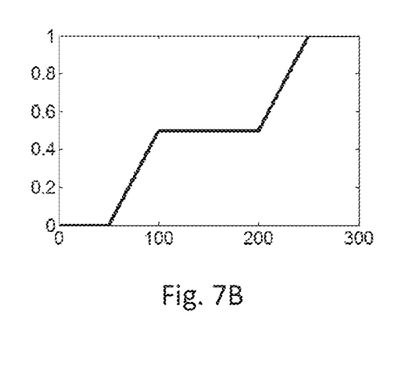

A linear interpolation between the image value $I_1$ of image 1 to the image value $I_2$ of image 2 is shown in FIG. 7A. In this case, the linear function starts from a value 0, e.g. at an interpolation value 50, and increases linearly to a value 1 at the exemplary interpolation value 250. FIG. 7B shows another possibility for the interpolation between both images. Again, at the interpolation parameter 50 the image value increases linearly up to the value 0.5, which is reached at the interpolation value 100. Between the interpolation values 100 and 200, the pixel value P remains constant. Beyond the interpolation value 200 the pixel value P again increases linearly to reach again the value 1 at the interpolation value 250.

Figure 7C:
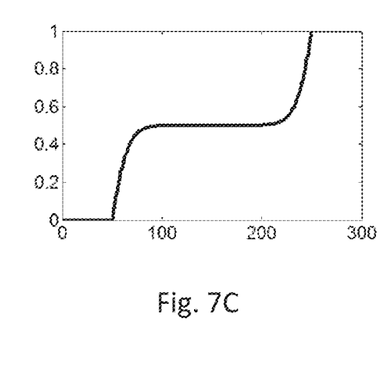
Figure 7D:
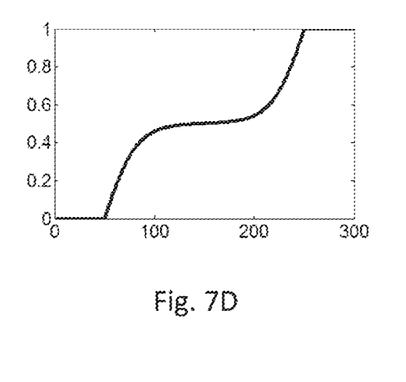

FIGS. 7C, D show further possibilities, wherein the increase in the pixel value P is not a linear function, but the increase is non-linear.

In FIG. 7C the pixel value is again 0 between the interpolation values 0 and 50, it starts increasing non-linearly up to the pixel value P=0.5 which is reached around the interpolation value 100. Between the interpolation values 100 and 200 the pixel value P again remains constant and increases subsequently as a non-linear function from the interpolation value 200 to the interpolation value 250 to reach the value 1 and the interpolation value 250. FIG. 7D shows a further possibility for the pixel value P, which again starts increasing non-linearly (e.g. as a convex function) at the interpolation value 50 from 0 to 0.5 which is reached at the interpolation value 150 and, subsequently, the pixel value P increases as a concave function to reach the pixel value 1 at the interpolation value 250.

The non-linear functions may be any function (as e.g. given by a tan h-function or any other trigonometric or non-trigonometric function). The present invention is not limited in any way by the selection of the particular interpolation of the pixel value. This interpolation as well as the positions (i.e. the particular interpolation values) where the increase/decrease starts or ends can be selected freely. In addition, the intermediate region, where the pixel value P remains constant (e.g. between the interpolation values 100 and 200), can be controlled to have any desired width and any desired start and end points.

It should also be understood, the black and white colors are only used to distinguish between the two options, i.e. which contribution of image data of the first image and which contribution of image data of the second image will be combined with each other. There is no correlation between the black color and/or white color used with the actual color of the corresponding image.

Conventional surround view systems for commercial vehicles had the disadvantage that lead to improper visibility of the objects around the vehicle. The current invention improves the visibility of the object in the areas where the images from two cameras are synthesized. In particular, the combining of pixels in image synthesizing based on wide blending close to the vehicle allows maximum visibility of the objects.

In comparison to conventional blending procedures, the advantageous aspects of the various embodiments can be summarized as follows:

An image synthesizing method for driver assistance systems may comprise: two or more cameras; an image synthesizer characterized in that the views of the scene from the cameras are combined into one view using a wide blending mask already close to the vehicle.

The image synthesizing method may further be characterized in that the area where the images are combined is wide enough to contain the traffic relevant objects (obstacles, pedestrians, cyclists).

This invention also includes a different blending area definition in the vicinity of the vehicle to avoid improper visibility of the objects around the stitching area where the two camera images meet. The visibility can be improved by making the blending area wide in the area close to the vehicle as well.

All methods described herein may also be a computer-implemented method. A person of skill in the art would readily recognize that steps of various above-described methods may be performed by programmed computers. Embodiments are also intended to cover program storage devices, e.g., digital data storage media, which are machine or computer readable and encode machine-executable or computer-executable programs of instructions, wherein the instructions perform some or all of the steps of the above-described methods, when executed on the a computer or processor.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature described in one embodiment may also be realized in other embodiments. Such combinations are covered by the disclosure herein unless it is stated that a specific combination is not intended.

LIST OF REFERENCE SIGNS 100 image synthesizer
110 receiving module
120 combining module
123 combined image
130 blending mask
140 combined picture with binary masking
201 first camera
202 second camera
211 first image
211a non-overlapping part of the first image
212 second image
212a non-overlapping part of the second image
213 overlapping region
235 blending region
235a first side
235b-d further sides of the blending region
235e second side
240 combined picture
400 object
500 vehicle
505 corner region

The invention claimed is:

1. An image synthesizer for a driver assisting system of a vehicle, comprising:
   a receiving module to receive a first image from a first camera and a second image from a second camera, wherein the driver assisting system includes the first camera configured to capture the first image from a first scene and the second camera configured to capture the second image from a second scene, wherein the first scene and the second scene overlap in an overlapping region, and wherein the overlapping region includes a blending region; and
   a combining module to combine the first image and the second image in the overlapping region by applying a blending mask;
   wherein the blending mask is applied to the blending region and provides an interpolation along an interpolation direction between image data of the first image and image data of the second image depicted on opposite sides of the blending region, wherein the blending region includes a width measured in the first image and/or the second image, wherein the width has a non-zero minimal value, and wherein the blending region includes the width which is greater than a minimal width along any path of light received by the first camera or of the second camera from the blending region,
   wherein the first image is depicted at a first side of the blending region and the second image is depicted at a second side, which is opposite to the first side, of the blending region,
   wherein the first image and the second image depict different sides of the vehicle, so that the first image and the second image overlap in the overlapping region around a corner of the vehicle, and wherein the overlapping region includes the blending region, and
   wherein the minimum width is freely selectable so that any objects are projected into and not outside of the blending region, so that the objects can be made visible, even if the object is directly at a corner.

2. The image synthesizer of claim 1, wherein the blending mask is formed as a masking strip extending away from a corner of the vehicle or from a side of the vehicle, and wherein the masking strip includes a maximum value less than a predetermined value.

3. The image synthesizer of claim 1, wherein the first scene is adjacent to a first side of the vehicle and the second scene is adjacent to the second side of the vehicle, the second side being perpendicular to the first side of the vehicle, and the combining module is configured to combine the first image and the second image to a bird's eye view of the first scene and the second scene.

4. The image synthesizer of claim 1, wherein the minimal width of the blending region is selectable in a range to make traffic objects of different sizes visible without cutting off parts of the traffic objects.

5. The image synthesizer of claim 1, wherein the blending region includes a plurality of pixels and the blending mask defines for each pixel of the plurality of pixels in the blending region a pixel value P which is defined by:

$$P=\alpha *I_1+(1-\alpha)*I_2$$

wherein P denotes the pixel value calculated as the weighted sum of the respective pixel value ($I_1$) of the first image and the respective pixel value ($I_2$) of the second image, wherein the weight function $\alpha$ depends on the position in the blending region such that the pixel values P interpolate between the pixel values ($I_1$, $I_2$) of the first image and the second image along the interpolation direction of the blending region and the weight function $\alpha$ represents a non-angular interpolation parameter.

6. The image synthesizer of claim 5, wherein the weight function $\alpha$ is for at least some of the plurality of pixels a binary function taking only a first value being 0 and a second value being 1 in the blending region, and wherein the interpolation between the first image and the second image is achieved by varying a relative distribution of the first and second values inside the blending region.

7. The image synthesizer of claim 5, wherein the width is at least piece-wise constant and the weight function $\alpha$ varies only along the interpolation direction.

8. The image synthesizer of claim 1, wherein the interpolation along the interpolation direction is defined by an at least piecewise linear function and/or an at least piecewise non-linear function and/or an at least piecewise constant function or any combination thereof.

9. A driver assisting system, comprising:
a first camera configured to capture a first image from a first scene;
a second camera configured to capture a second image from a second scene, wherein the first scene and the second scene at least partly overlap over in an overlapping region; and
an image synthesizer, including:
a receiving module to receive a first image from a first camera and a second image from a second camera, wherein the driver assisting system includes the first camera configured to capture the first image from a first scene and the second camera configured to capture the second image from a second scene, wherein the first scene and the second scene overlap in an overlapping region, and wherein the overlapping region includes a blending region; and
a combining module to combine the first image and the second image in the overlapping region by applying a blending mask;
wherein the blending mask is applied to the blending region and provides an interpolation along an interpolation direction between image data of the first image and image data of the second image depicted on opposite sides of the blending region, wherein the blending region includes a width measured in the first image and/or the second image, wherein the width has a non-zero minimal value, and wherein the blending region includes the width which is greater than a minimal width along any path of light received by the first camera or of the second camera from the blending region,
wherein the first image is depicted at a first side of the blending region and the second image is depicted at a second side, which is opposite to the first side, of the blending region,
wherein the first image and the second image depict different sides of the vehicle, so that the first image and the second image overlap in the overlapping region around a corner of the vehicle, and wherein the overlapping region includes the blending region, and
wherein the minimum width is freely selectable so that any objects are projected into and not outside of the blending region, so that the objects can be made visible, even if the object is directly at a corner.

10. The driver assisting system of claim 9, further comprising:
a display; and
a control unit configured to receive a combined image from the combining module and to create a bird's eyes view from the first image, the second image and the combined image and to display the bird's eye view on the display.

11. A vehicle, comprising:
a driver assisting system, including:
a first camera configured to capture a first image from a first scene;
a second camera configured to capture a second image from a second scene, wherein the first scene and the second scene at least partly overlap over in an overlapping region; and
an image synthesizer, including:
a receiving module to receive a first image from a first camera and a second image from a second camera, wherein the driver assisting system includes the first camera configured to capture the first image from a first scene and the second camera configured to capture the second image from a second scene, wherein the first scene and the second scene overlap in an overlapping region, and wherein the overlapping region includes a blending region; and
a combining module to combine the first image and the second image in the overlapping region by applying a blending mask;
wherein the blending mask is applied to the blending region and provides an interpolation along an interpolation direction between image data of the first image and image data of the second image depicted on opposite sides of the blending region, wherein the blending region includes a width measured in the first image and/or the second image, wherein the width has a non-zero minimal value, and wherein the blending region includes the width which is greater than a minimal width along any path of light received by the first camera or of the second camera from the blending region;

wherein the first camera and the second camera are arranged along one side of the vehicle or on two adjacent sides of the vehicle, wherein the first image is depicted at a first side of the blending region and the second image is depicted at a second side, which is opposite to the first side, of the blending region, wherein the first image and the second image depict different sides of the vehicle, so that the first image and the second image overlap in the overlapping region around a corner of the vehicle, and wherein the overlapping region includes the blending region, and wherein the minimum width is freely selectable so that any objects are projected into and not outside of the blending region, so that the objects can be made visible, even if the object is directly at a corner.

12. A method for synthesizing an image using a driver assisting system, the method comprising:

receiving a first image from a first camera and a second image from a second camera, wherein the driver assisting system includes the first camera configured to capture the first image from a first scene and the second camera configured to capture the second image from a second scene, wherein the first scene and the second scene overlap in an overlapping region, and wherein the overlapping region includes a blending region; and combining the first image and the second image in the overlapping region by applying a blending mask to the blending region;

wherein the blending mask provides an interpolation along an interpolation direction between the first image and the second image depicted on opposite sides of the blending region, and wherein the blending region includes a width greater than a minimal width along any path of light received by the first camera or of the second camera from the blending region, wherein the first image is depicted at a first side of the blending region and the second image is depicted at a second side, which is opposite to the first side, of the blending region, wherein the first image and the second image depict different sides of the vehicle, so that the first image and the second image overlap in the overlapping region around a corner of the vehicle, and wherein the overlapping region includes the blending region, and wherein the minimum width is freely selectable so that any objects are projected into and not outside of the blending region, so that the objects can be made visible, even if the object is directly at a corner.

13. A non-transitory computer readable medium having a computer program, which is executable by a processor, comprising:

a program code arrangement having program code for synthesizing an image using a driver assisting system, by performing the following:

receiving a first image from a first camera and a second image from a second camera, wherein the driver assisting system includes the first camera configured to capture the first image from a first scene and the second camera configured to capture the second image from a second scene, wherein the first scene and the second scene overlap in an overlapping region, and wherein the overlapping region includes a blending region; and combining the first image and the second image in the overlapping region by applying a blending mask to the blending region;

wherein the blending mask provides an interpolation along an interpolation direction between the first image and the second image depicted on opposite sides of the blending region, and wherein the blending region includes a width greater than a minimal width along any path of light received by the first camera or of the second camera from the blending region, wherein the first image is depicted at a first side of the blending region and the second image is depicted at a second side, which is opposite to the first side, of the blending region, wherein the first image and the second image depict different sides of the vehicle, so that the first image and the second image overlap in the overlapping region around a corner of the vehicle, and wherein the overlapping region includes the blending region, and wherein the minimum width is freely selectable so that any objects are projected into and not outside of the blending region, so that the objects can be made visible, even if the object is directly at a corner.

* * * * *